United States Patent [19]
Hung

[11] Patent Number: 5,842,736
[45] Date of Patent: Dec. 1, 1998

[54] VEHICLE SAFETY REAR PANEL FOR SUPPORTING HORN

[76] Inventor: Shu Hui Hung, No. 19-1, Tzeng Der 2nd Lane, Su Der Li Taichung, Taiwan

[21] Appl. No.: 921,834

[22] Filed: Sep. 2, 1997

[51] Int. Cl.[6] .................................................. B60R 27/00
[52] U.S. Cl. ................................................................ 296/189
[58] Field of Search ............................................. 296/189

[56] References Cited

U.S. PATENT DOCUMENTS 5,267,772  12/1993  Ohta et al. ................................ 296/189

FOREIGN PATENT DOCUMENTS 128848  6/1987  Japan ....................................... 296/186

Primary Examiner—Gary C. Hoge

[57] ABSTRACT

A vehicle rear panel includes a plate having one or more lateral notches formed in the bottom portion for allowing the plate to be folded. A board has a rear portion secured to the rear portion of the plate. The plate may be folded for preventing the plate from hurting passenger when shocks and vibrations are transmitted to the plate. The board may be tilted by the plate for protecting the passenger when the plate is folded. One or more resilient bars may be engaged in the lateral notches for absorbing shocks transmitted to the plate.

3 Claims, 4 Drawing Sheets

VEHICLE SAFETY REAR PANEL FOR SUPPORTING HORN

BACKGROUND OF THE INVENTION

1. Field of the Invention

The present invention relates to a rear panel, and more particularly to a vehicle safety rear panel for supporting horn.

2. Description of the Prior Art

Typical vehicles comprise a rear panel secured behind the rear seat for supporting horns. The rear panel is normally located right behind the neck portion of the passengers and will cut off or damage the neck portion of the passenger when the vehicle is hit from behind.

The present invention has arisen to mitigate and/or obviate the afore-described disadvantages of the conventional vehicle rear panels.

SUMMARY OF THE INVENTION

The primary objective of the present invention is to provide a vehicle rear panel which includes a safety configuration for allowing the rear panel to be folded and for preventing the rear window from hurting the passengers.

In accordance with one aspect of the invention, there is provided a vehicle rear panel comprising a plate including a bottom portion having at least one lateral notch formed in the bottom portion and extended along a length of the plate for defining a front segment and a rear segment of the plate and for allowing the front segment and the rear segment to be pivotally coupled together at a living hinge, the plate including at least one opening for engaging with horn member, and a board including a rear portion secured to the rear segment of the plate and including a front portion adapted to be disengaged from the front segment of the plate. The plate is allowed to be folded for preventing the plate from hurting the passenger and for preventing the broken glass of the rear window from hurting the user when shocks and vibrations are transmitted to the plate and when the vehicle is hit from behind. The board is allowed to be tilted by the plate and located between the passenger and the rear window of the vehicle for protecting the passenger when the plate is forced to be folded about the living hinge.

The plate further includes at least one resilient bar engaged in the lateral notch for absorbing shocks transmitted to the plate and for further preventing the plate from hurting the passenger.

A releasing sheet is engaged between the plate and the resilient bar for allowing the resilient bar to be easily disengaged from the plate and for allowing the plate to be easily folded when the vehicle is hit from the rear portion by the other vehicle.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
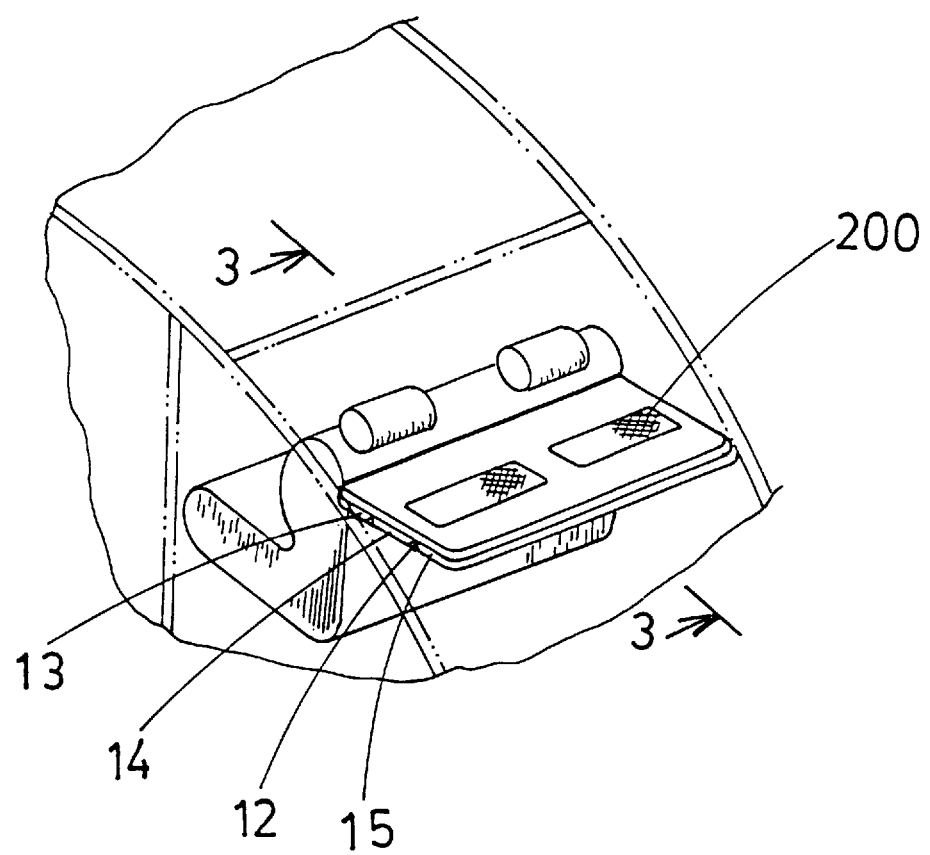
FIG. 1 is a perspective view of a vehicle rear panel in accordance with the present invention.
Figure 2:
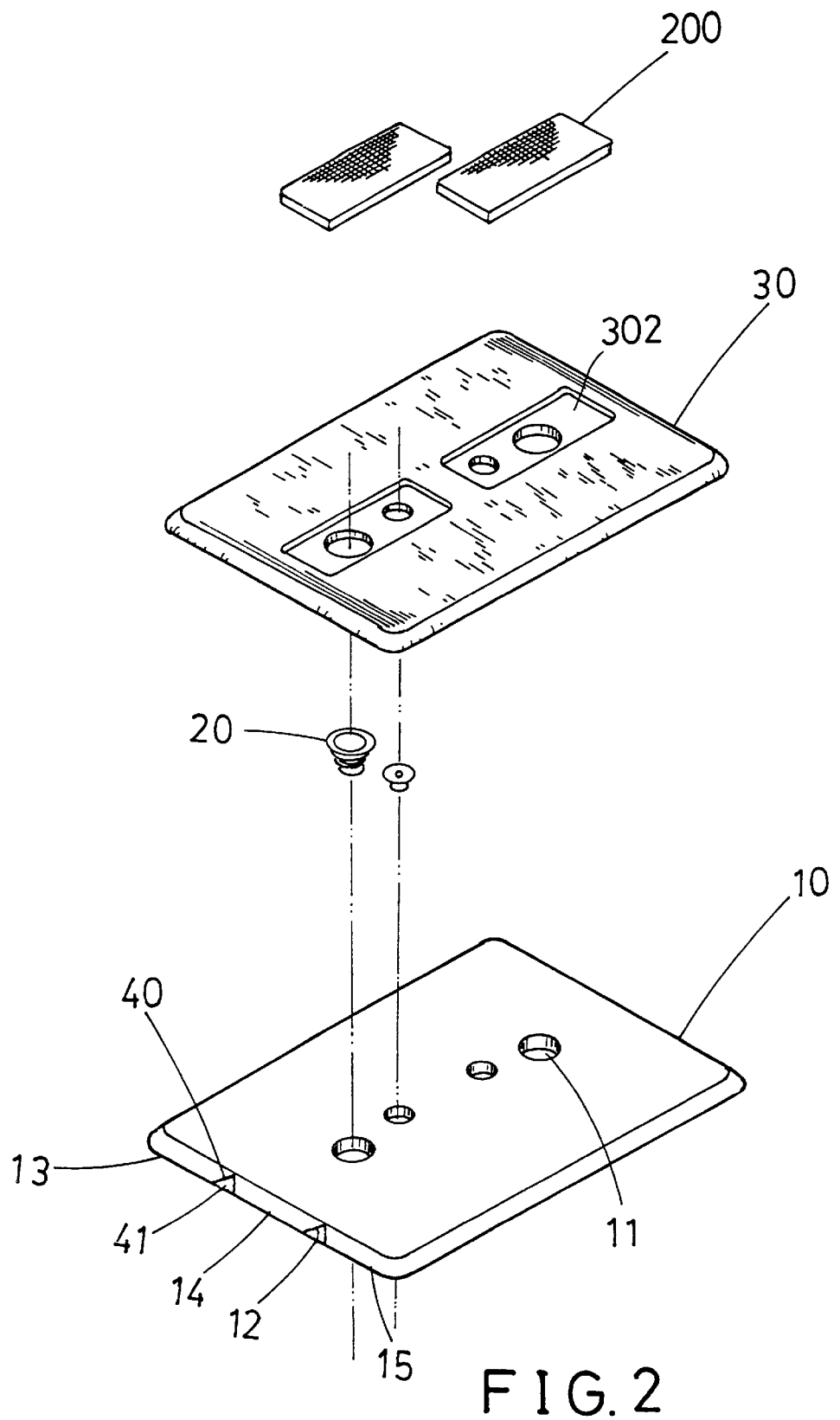
FIG. 2 is an exploded view of the vehicle rear panel.
Figure 3:
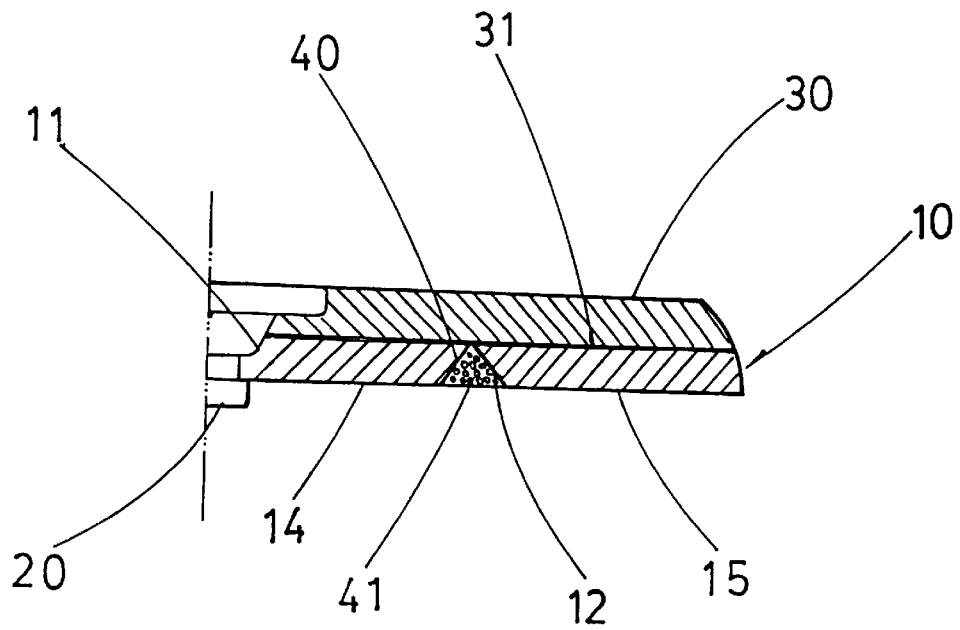
FIG. 3 is a cross sectional view taken along lines 3—3 of FIG. 1.

Referring to the drawings, and initially to FIGS. 1—3, a vehicle rear panel in accordance with the present invention comprises a plate 10 for securing in the rear portion of the vehicle and including one or more openings 11 for securing horns 20. The plate 10 includes a bottom portion having two spaced lateral notches 12 formed along the length of the plate 10 for separating the plate 10 into a front segment 13, a middle segment 14 and a rear segment 15. The lateral notches 12 each includes a triangular structure having a tip facing upward for forming living hinges and for allowing the segments 13, 14, 15 to be pivotally coupled together by the living hinges and for allowing the segments 13, 14, 15 to be folded relative to each other, best shown in FIGS. 4, 5.

Figure 4:
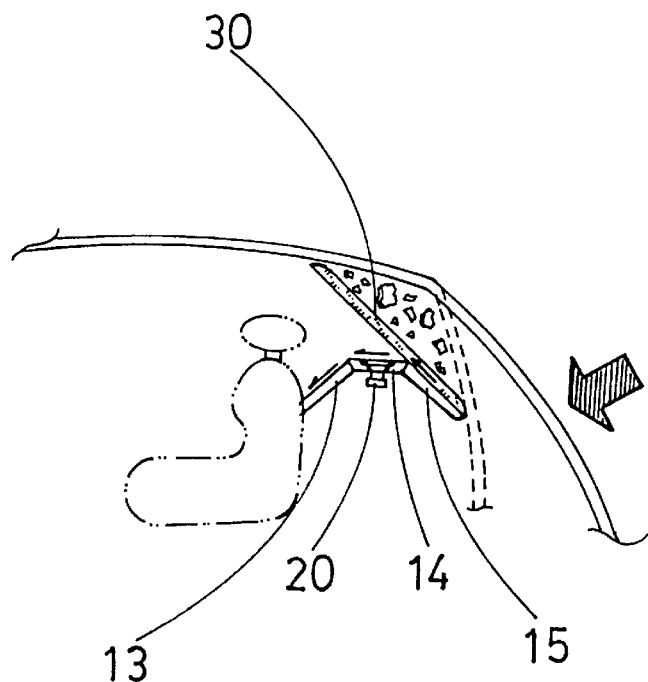
FIG. 4 is a plane view illustrating the operation of the vehicle rear panel.
Figure 5:
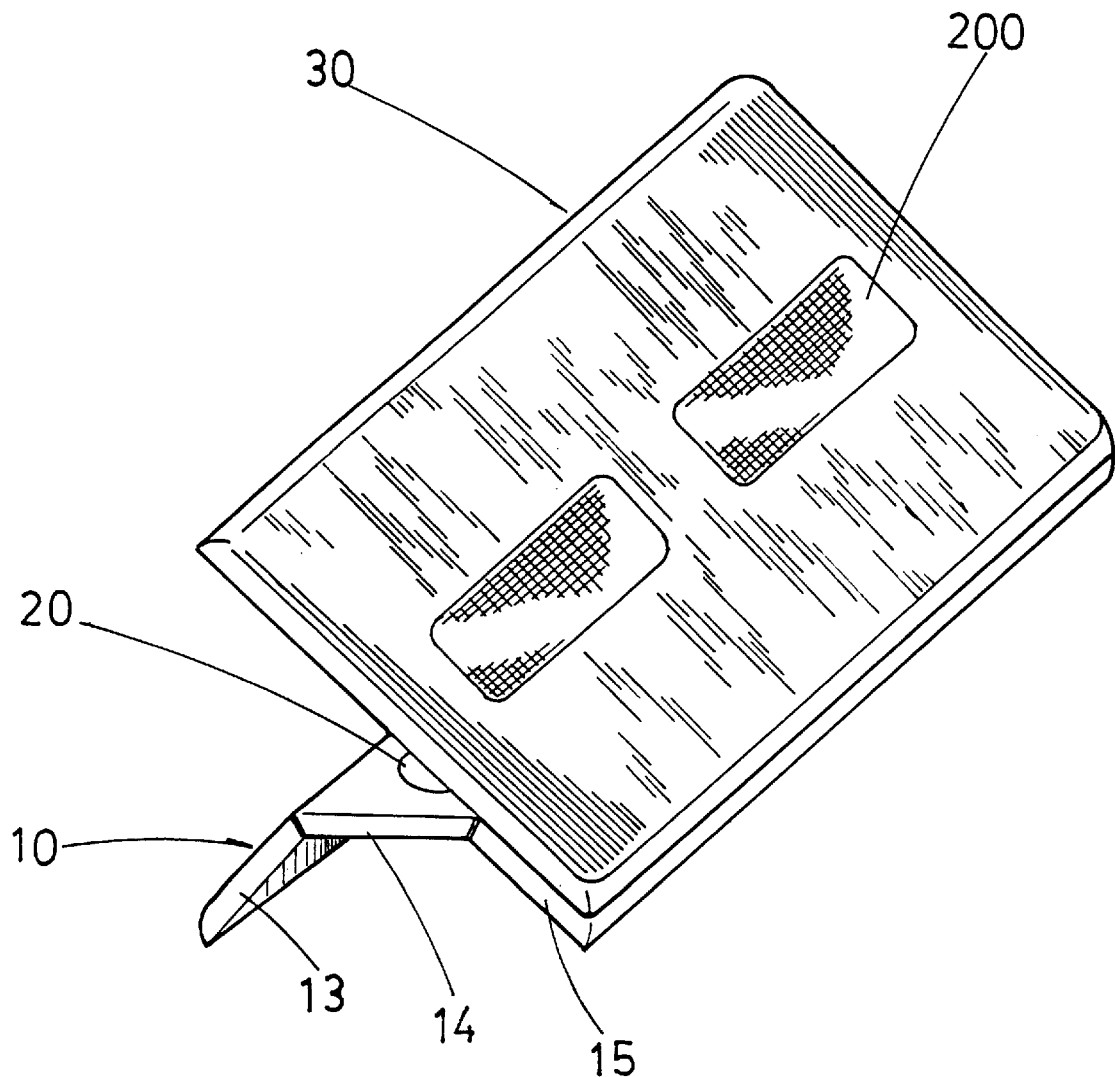
FIG. 5 is a perspective view illustrating the operation of the vehicle rear panel.

Two triangular resilient or foamable bars 41 are engaged in the notches 12 and two releasing sheets 40 are engaged between the bars 41 and the plate 10 for allowing the bars 41 to be easily forced outward and disengaged from the plate 10 when the segments 13–15 are folded as shown in FIGS. 4, 5. A board 30 includes a rear and bottom portion secured to the rear segment 15 of the plate 10 by adhesive material 31 (FIG. 3) for allowing the middle and the front portion of the board 30 to be disengaged from the front and middle segments 13, 14 of the plate (FIGS. 4, 5) when the segments 13–15 are folded. The board 30 includes one or more recesses 302 for engaging with screens 200 which may be used for covering or shielding or protecting the horns 20.

Referring next to FIGS. 4 and 5, the segments 13–15 of the plate 10 may be folded and the board 30 may be tilted and located between the rear window and the passengers, for protecting the passengers and for preventing the passengers from being hurt by the broken glass of the rear window.

It is to be noted that the resilient bars 41 may absorb the shocks and vibrations transmitted to the plate 10 to some extent before the segments 13–15 of the plate 10 are folded. This may further prevent the passengers from being seriously hurt.

Accordingly, the vehicle rear panel in accordance with the present invention includes a safety configuration for allowing the rear plate to be folded and for allowing the board to form a shielding member which may be provided for preventing the rear window from hurting the passengers.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A vehicle rear panel comprising:

a plate including a bottom portion having at least one lateral notch formed in said bottom portion and extended along a length of said plate for defining a front segment and a rear segment of said plate and for allowing said front segment and said rear segment to be pivotally coupled together at a living hinge, said plate including at least one opening for engaging with horn member, and a board including a rear portion secured to said rear segment of said plate and including a front portion adapted to be disengaged from said front segment of said plate, said plate being allowed to be folded for preventing said plate from hurting passenger when shocks and vibrations are transmitted to said plate, said board being allowed to be tilted by said plate for protecting the passenger when said plate is forced to be folded about said living hinge.

2. A vehicle rear panel according to claim 1 wherein said plate further includes at least one resilient bar engaged in said at least one lateral notch for absorbing shocks transmitted to said plate.

3. A vehicle rear panel according to claim 2 further comprising releasing sheet engaged between said plate and said at least one resilient bar.

\* \* \* \* \*